S. B. MILLER.
FEED BAG.
APPLICATION FILED APR. 14, 1911.
1,044,221.
Patented Nov. 12, 1912.
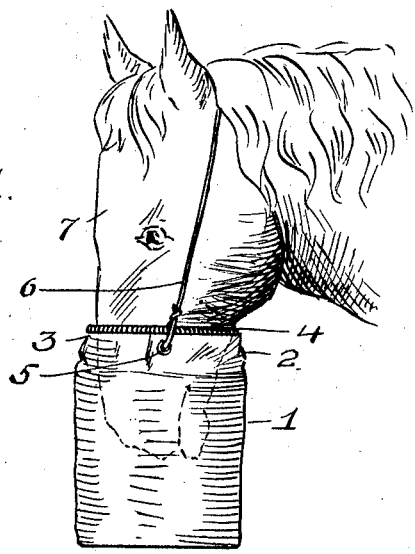
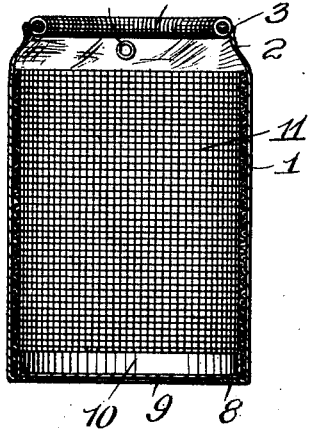
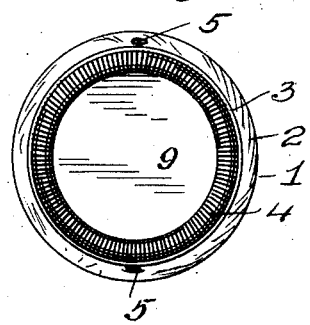
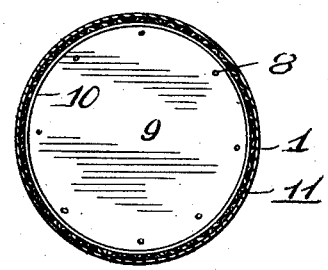
WITNESSES:
Samuel Payne
K. H. Butler
INVENTOR.
S. B. Miller.
BY H. C. Everett Co.
ATTORNEYS.

UNITED STATES PATENT OFFICE.

SAMUEL BENTON MILLER, OF VANDERGRIFT HEIGHTS, PENNSYLVANIA.

FEED-BAG.

1,044,221. Specification of Letters Patent. Patented Nov. 12, 1912.

Application filed April 14, 1911. Serial No. 621,121.

*To all whom it may concern:*

Be it known that I, SAMUEL BENTON MILLER, a citizen of the United States of America, residing at Vandergrift Heights, in the county of Westmoreland and State of Pennsylvania, have invented certain new and useful Improvements in Feed-Bags, of which the following is a specification, reference being had therein to the accompanying drawing.

This invention relates to feed bags for horses and other animals, and the objects of my invention are to provide a feed bag from which feed cannot be wasted while the horse is feeding, and to provide a feed bag that can be easily cleaned and maintained in a sanitary condition.

Other objects of my invention are to furnish the upper end of the feed bag with a yieldable gripping ring that will snugly engage the nose of a horse and prevent the feed from being wasted, and to accomplish the above results by a bag or a feed receptacle that is simple in construction, durable and inexpensive to manufacture.

With the above and other objects in view the invention resides in a novel construction, combination and arrangement of parts to be hereinafter specifically described and then claimed.

Reference will now be had to the drawing, wherein:—

Figure 1 is a side elevation of the feed bag. Fig. 2 is an enlarged vertical sectional view of the same. Fig. 3 is a plan, and Fig. 4 is a horizontal sectional view of the bag.

A feed bag or receptacle in accordance with this invention comprises a cylindrical casing 1, preferably made of canvas. The upper edge of the casing 1 is gathered, as at 2 and stitched or otherwise connected, as at 3 to a yieldable gripping ring 4, preferably made of a coiled wire. The gathered edge 2 of the casing 1 has diametrically opposed walls thereof provided with eyelets 5 whereby a cord or strap 6 can be attached to the casing to suspend the same upon the horse's head 7. The lower end of the casing 1 is inturned to provide an annular flange and mounted upon said flange and secured thereto by rivets or other means as at 8 is a pan 9, preferably made of a non-corrodible material, as galvanized tin.

Detachably connected or loosely mounted upon the vertical walls 10 of the pan 9 is a cage or foraminous body 11, preferably made of non-corrodible wire screening. The cage 11 maintains the casing 1 in a cylindrical form and by expanding the ring 4 the cage can be removed and thoroughly cleansed. The yieldable or gripping ring 4 prevents the movement of the horse's head from dislodging feed within the bag, said ring yielding to the movement of the horse's jaw when consuming the food.

What I claim is:—

A feed bag comprising a cylindrical casing having the upper portion thereof contracted, a yieldable gripping ring formed of closely arranged coils positioned against the inner face of the upper terminus of said contracted portion and projecting above said contracted portion, a pan arranged within and having the lower portion of said casing secured thereto, and a cylindrical foraminous shell of the same diameter throughout positioned within said casing and extending from the lower terminus of said contracted portion to the top edge of said pan, said shell snugly engaging the inner face of said casing.

In testimony whereof I affix my signature in the presence of two witnesses.

SAMUEL BENTON MILLER.

Witnesses:
J. F. BAIR,
JESS M. GEORGE.

Copies of this patent may be obtained for five cents each, by addressing the "Commissioner of Patents, Washington, D. C."